(12) United States Patent
Henderson et al.

(10) Patent No.: US 9,537,910 B2
(45) Date of Patent: Jan. 3, 2017

(54) COMMUNICATION AND ACTION APPROVAL SYSTEM AND METHOD

(71) Applicant: Pryvy, LLC, Las Vegas, NV (US)

(72) Inventors: Jason Henderson, Carmel, CA (US); Sankhyayan Debnath, Seattle, WA (US)

(73) Assignee: PRYVY, LLC, Las Vegas, NV (US)

( * ) Notice: Subject to any disclaimer, the term of this patent is extended or adjusted under 35 U.S.C. 154(b) by 0 days.

(21) Appl. No.: 14/519,115

(22) Filed: Oct. 20, 2014

(65) Prior Publication Data

US 2015/0113605 A1 Apr. 23, 2015

Related U.S. Application Data

(60) Provisional application No. 61/892,759, filed on Oct. 18, 2013.

(51) Int. Cl.
*H04L 12/22* (2006.01)
*H04L 29/06* (2006.01)
*G06Q 50/00* (2012.01)
*H04L 9/32* (2006.01)

(52) U.S. Cl.
CPC ............. *H04L 65/403* (2013.01); *G06Q 50/01* (2013.01); *H04L 63/102* (2013.01)

(58) Field of Classification Search
None
See application file for complete search history.

(56) References Cited

U.S. PATENT DOCUMENTS

| | | | | |
|---|---|---|---|---|
| 7,860,995 B1* | 12/2010 | Singh | ............... | G06Q 30/02 709/231 |
| 2009/0265210 A1* | 10/2009 | Bonner | ............ | G06Q 10/06 705/7.13 |
| 2013/0104246 A1* | 4/2013 | Bear | ................. | H04L 63/10 726/28 |
| 2013/0260721 A1* | 10/2013 | Carney | ............ | H04L 63/10 455/411 |
| 2013/0339241 A1* | 12/2013 | Knight | ............ | G06Q 20/405 705/44 |

FOREIGN PATENT DOCUMENTS

FI WO 0199378 A1 * 12/2001 ............ G06F 21/42

* cited by examiner

*Primary Examiner* — Venkat Perungavoor
(74) *Attorney, Agent, or Firm* — Sheppard Mullin Richter & Hampton LLP

(57) ABSTRACT

A computer-based method for real-time communication authorization includes receiving, from a first communication device, a communication request, verifying, with a verification engine, a pre-approval status of the communication request, storing the communication request in an approval queue if the communication authorization the pre-approval status is set to false, issuing an alert to the authorization device, and receiving one or more authorization parameters from an authorization device.

9 Claims, 8 Drawing Sheets

COMMUNICATION AND ACTION APPROVAL SYSTEM AND METHOD

CROSS-REFERENCE TO RELATED APPLICATIONS

This application claims the benefit of and priority to U.S. Provisional Application 61/892,759 filed on Oct. 18, 2013, the contents of the which are incorporated herein by reference.

FIELD OF THE INVENTION

The present invention relates generally to communication, social and action approval systems.

BACKGROUND OF THE INVENTION

In today's world, most children want to communicate with their friends using telephones, SMS/MMS and chat technologies, as well as private and public status and media (photo/video) sharing web, native and mobile apps. Most children also want to visit websites, watch videos, play games, shop, bank, and do many other things that adults enjoy doing with web, native and mobile apps.

The use of such communication systems by children presents a number of problems. One such problem is that if parents or guardians allow children to have communication means (e.g., email, text messaging, chat, etc.), they cannot control with whom the children communicate. Another related problem is allowing children to communicate with other children and adults that are part of the groups (e.g. teams, classes, camps, religious associations, etc.) in which they participate. A further problem is that if parents or guardians allow children to use other web, native and mobile apps (e.g., shopping online), or playing a community game through an app or device, they have no way of controlling with whom a child communicates, or whether transactions or sensitive communications with the app should be allowed (e.g., whether a child is allowed to shop and buy something, or whether a YouTube® video requires approval before viewing). An additional problem is that if parents or guardians allow their children to use a desktop, laptop or tablet/mobile computer to visit websites or use apps, they cannot discern what activities those children participated in after the fact, or approve those activities while they were occurring.

As set forth above, current communication, web, native and mobile app platforms do not have systems that allow parents or guardians to approve the people or groups with whom their children communicate, or to approve actions children would like to perform in web, native, and mobile apps. Moreover, these app platforms do not feature web, native or mobile apps allow for tracking of activity to report back to parents or guardians.

Current monitoring services for desktops, laptops and some tablets and mobile devices are complex, require installation, and are typically difficult to install. Additionally, such services must be installed to operate concealed from all users, and are not targeted to solve the specific problem of helping parents and guardians understand what their children are doing with technology so that ensuing discussion and education may take place.

BRIEF SUMMARY OF EMBODIMENTS OF THE INVENTION

Embodiments of the present disclosure are directed toward a communication, social, and action approval system and method. Some such embodiments are directed toward a system that works in between the child and the activity in which the child is attempting to participate, or in which they are actively participating. Specifically, a parent or guardian may select an option that requires their approval of communication and other web and mobile activities before they occur. Further embodiments of the invention allow parents or guardians to selectively view prior activities of their child or children. These embodiments are implemented without the need for stealth installation and with complete transparency for the child to see that they are being approved and monitored.

One embodiment of the disclosure is directed toward a non-transitory computer readable medium having computer executable program code embodied thereon, the computer executable program code configured to: provide a secure digital citizenship service that requires parent or guardian approval of a selected communication, social or other web or mobile activity before the activity can occur.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention.

Figure 1:
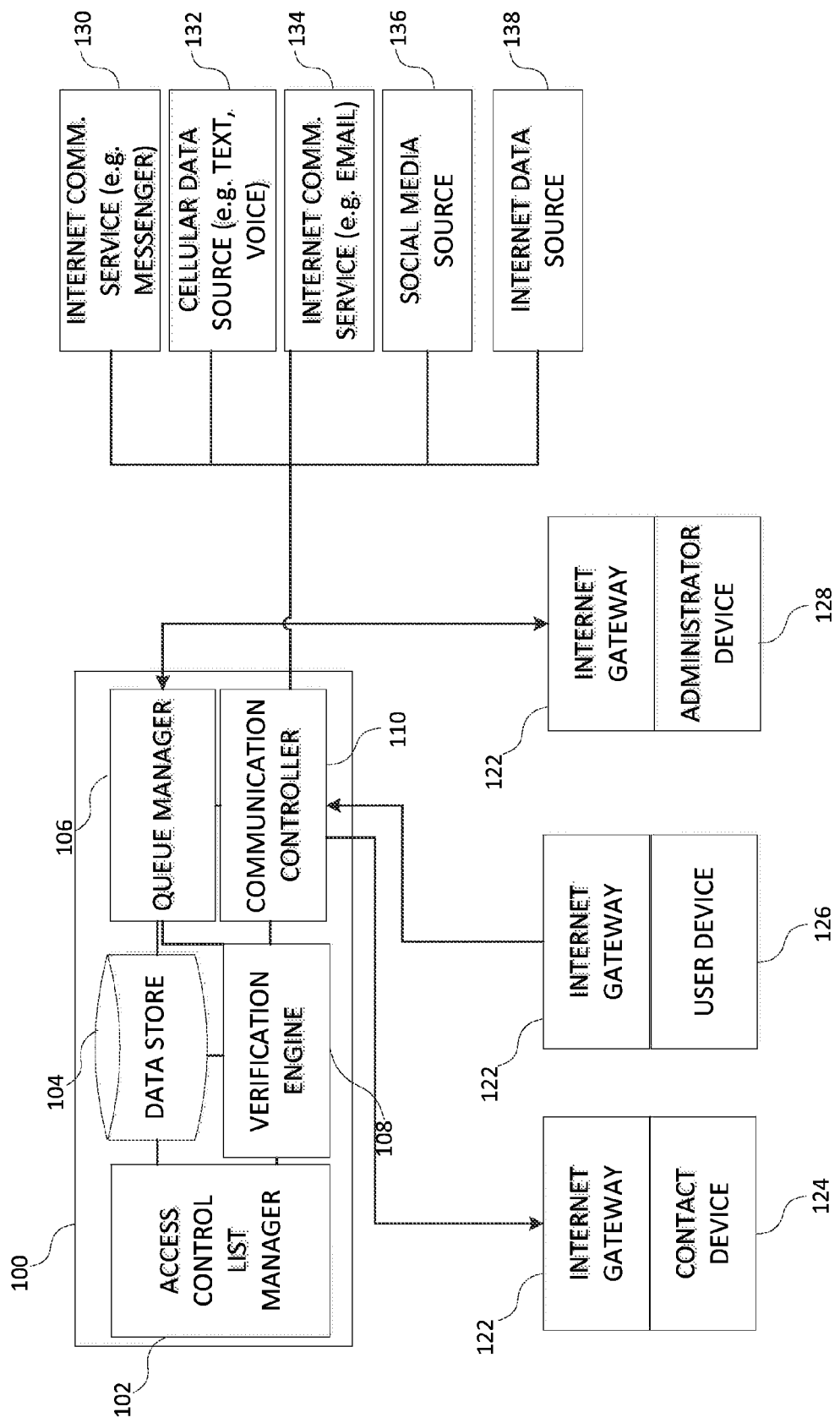
FIG. 1 is a block diagram illustrating a system for real-time communication authorization consistent with embodiments disclosed herein.

These figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

The present disclosure is directed toward a communication, social, and action approval system and method. In some cases, the communication, social, and action approval system and method can be implemented as part of a secure digital citizenship service. In some embodiments, the communication and action approval system is disposed between a child and the activity in which the child is attempting to participate, or in which they are already actively participating. In certain embodiments, a parent or guardian may select an option that requires parent or guardian approval of all communication and other web and mobile activities before they occur. In further embodiments, parents can selectively view prior activities of their child or children.

Several exemplary environments in which the communication and action approval system and method may be employed will now be described.

Example 1

For Friends

In this example, a child named Alec uses a secure digital citizenship service by searching for a friend in an area by name. If Alec successfully locates his friend, he then requests approval to connect with the friend. The approval request is then sent to Alec's parent or guardian. In addition, an optional notification may also be sent to the parent or guardian through email, web, native or mobile app notification. If Alec is unable to locate his friend, he can enter the email address of his friend's parent(s) or guardian(s) to invite the friend and his family to join the secure digital citizenship service, thereby restarting the approval process.

Example 2

For Communication

In this example, a child named Belle desires to use the secure digital citizenship service to communicate with others. In the case where Belle wants to communicate with an approved friend, she is allowed to do so automatically. If Belle wants to communicate via email, text message, chat, video-game embedded messenger, voice or video push-to-talk, voice or video call, status or media post, or voice or video message with someone who is not an approved friend, she may attempt to make the communication. In operation, the system intercepts the communication, and sends an approval request to Belle's parent or guardian. If the parent or guardian approves the communication, it is forwarded to the desired party. However, no action is taken without this approval, and notification of the rejection is not sent to either party. Likewise, if someone other than the child attempts to initiate communication (using a user name, number or address), and that contact point was not previously approved by the parent or guardian, the communication is intercepted, and placed in queue to be approved by the parent or guardian. If the approval is granted, the communication is allowed through to the desired party.

Parents or guardians can configure different levels of allowed communication based on the party and the child. By way of example, a parent or guardian may allow the child to talk to a particular friend, but be copied on all communication, whereas the parent or guardian can simply allow communication with another person or group without being copied.

In some versions of this example, the level of monitoring may change over time, such that in a first state, communications are strictly monitored and the parent or guardian is copied on all communications, but in a second, less restrictive state, the parent or guardian may only be copied on some, or none, of the communications. Multiple monitoring states are possible, and the parent or guardian may manually switch between the security states, or set a pre-determined schedule to automatically reduce monitoring levels over time to less restrictive states as a child becomes older and more responsible. In some examples, the monitoring may include monitoring for a user's disabling of the monitoring service.

Example 3

For Web, Native and Mobile Applications

In this example, a web, native or mobile application utilizes proprietary application programming interfaces ("APIs") to query for selected information, or to request action from the digital citizenship service. In particular, the proprietary APIs can be used to: (i) determine if child, parent/guardian or family accounts are valid and have been verified by other users or administrators of the digital citizenship service; (ii) request approval from parents or guardians for a child for custom actions from within the web, native or mobile app; and/or (iii) report activity within the web, native or mobile app for consumption by the parent or guardian to monitor and measure such activity.

Example 4

For Monitoring

In this example, the parent or guardian installs monitoring software on the target desktop, laptop, tablet or mobile device. When the child logs in to the target device, the software is automatically started and minimized so that the child is aware that monitoring is occurring. The monitoring software then records screen shots, key strokes, mouse and touch activity, and websites visited inside of popular browsers. Alternatively, any pre-existing software may be configured to utilize a digital citizenship API or proxy to communicate with a monitoring server or appliance without the need for installation of software on the target device. All of this data is then sent in batches to the digital citizenship service servers for parents or guardians to observe. Alerts for particular types of activities or values of keys typed can be set up by parents or guardians for immediate notification.

Parents and guardians may also see reports of all communication and web, native and mobile app activity that is tracked by the digital citizenship service or third party applications that utilize the digital citizenship service API or proxy.

Example 4

Security Appliance

In this example, the parent or guardian installs a security appliance on the families private local area network. The security appliance may register with a subscription server hosted on the Internet. The parent or guardian may then configure the security appliance to manage communication and Internet access for one or more users. In this example, all of the communication authorization and monitoring functions described in Examples 1-3 are performed by the security appliance directly such that all communication and monitoring data is stored locally on the family's private network, and not on a centrally hosted server.

Referring now to FIG. 1, a system for real-time communication authorization includes a user device 126, a contact device 124, an administrative device 128, and a real-time access control server 100. For example, each of administrative device 128, user device 126 and contact device 124 may be smart phones, tablet computers, laptop computers, or desktop computers. User device 126 may be a request initiating communication device with communication software installed thereon, such that the device's user may desire to use the communication device to communicate with the user of the contact device 124. As such, contact device 124 may also be a communication device with communication software installed thereon. The communication software installed on both the user device 126 and the contact device 124 may be email software, instant messaging or text messaging software, social media software (e.g., FaceBook®, LinkedIn®, Instagram®, or other social media communication applications), video conferencing software (e.g., FaceTime®, Skype®, etc.), or voice communication software (e.g., current cellular phone communication software, Skype®, etc.). Without using functions of the embodiments disclosed herein, a user, using user contact device 124, would be able to use any of the communication software applications described above to freely initiate, receive, or otherwise participate in an electronic communication protocol-driven conversation with another contact using contact device 126. For example, the electronic communication protocol-driven conversation may utilize Internet communication service 130 (e.g., an electronic messenger service), cellular data source 132 (e.g., voice or text), Internet Communication Service 134 (e.g., email), social media source 136, or other Internet data source 138 as would be known to one of ordinary skill in the art.

Still referring to FIG. 1, the embodiments of the present disclosure provide a mechanism to restrict and control, in real-time, the ability of user device 126 to communicate via any of electronic communication protocol 130, 132, 134, 136, or 138, with contact device 124. Generally, in one embodiment, an administrative user may first install the real-time access control software application on the user device 126 and/or on contact device 124 and register either or both the user and the contact with the real-time access control server 100, within access-control list manager 102.

In other embodiments, the real-time access control software application is not installed on user device 126 or contact device 124. In these embodiments, user device 126 may be registered with real-time access-control server 100, such that real-time access-control server 100 may directly control, authorize, and/or restrict communications to and from the user device. For example, existing software applications installed on the user device 126 (e.g., chat messenger tools, short message service (SMS) text tools, video games with embedded electronic chat tools, voice communication software, social media interface applications, etc.) may incorporate an API or proxy that communicates with real-time access control server 100 to control, authorize, and/or restrict communications initiated with or terminating to those software applications in accordance with the systems and methods disclosed herein. In addition, the administrative user may also access the real-time access control software application from an administrative device 128 and then use administrator device 128 as an authorization device to pre-approve, or authorize, in real-time, a user's ability to communicate with a contact using any of these electronic communication protocols disclosed herein or as otherwise known in the art.

Still referring to FIG. 1, the user may trigger a communication request to the real-time access control server 100 by attempting to initiate an electronic communication protocol-driven conversation with any known contact (e.g., a contact who is also registered with or known to the real-time access control server). As used herein, a communication request may be any communication initiation through communication protocols disclosed herein, such as transmission of a text message, chat message, social media post, in-game chat, cellular or land-based telephone call, or other communication requests capable of being intercepted by a computer server. As would be appreciated by one in the art, any of these requests operate on known communication protocols that include a detectable initial communication request to open a connection with a target device. A computer server, such as the real-time access control server 100 disclosed herein, is capable of intercepting the initial communication request inherent in these communication protocols and/or connecting said communication request to a target device according to authorization criteria disclosed herein.

In some embodiments, the real-time access control server 100 is configured to receive a communication request from the user device 128 and verify a pre-approval status of the communication request. Real-time access control server 100 may include access control list manager 102, data store 104, queue manager 106, verification engine 108, and communication controller 110. Real-time access control server 100 may receive the communication request, for example, through communication controller 110.

Still referring to FIG. 1, communication controller 110 may store the communication request in an approval queue managed by queue manager 106. Queue manager 106 may then create a list of queued communication requests in data store 104. Verification engine 108 may analyze each queued communication request to determine if the target contact for the communication request is pre-approved. For example, an administrator may interact with access control list manager 102 to generate a list of pre-approved communication contacts, along with a list of communication authorization parameters that define the level of communication that is authorized. For example, the communication authorization parameters may include parameters defining which communication protocols 130, 132, 134, or 138 are authorized for a particular target contact, whether or not the communications will be logged and archived or displayed in real-time on an administrative monitor window display available on administrator device 128, and/or whether the approval will be permanent or temporary (e.g., a permanent approval will authorize all future communication requests for the particular target contact according to the defined communication authorization parameters, whereas a temporary approval may only enable the current communications, or enable communications for a limited period of time specified by the administrator).

In some embodiments, the communication request may include a specified communication technology selected from a set of supported communication technologies. For example, the set of supported communication technologies may include telephonic voice communication (e.g., telephone or cellular phone based communication), short message service (SMS) texting, instant messaging, social media messaging, social media posting (e.g., message posting, or access to social media sites like Facebook®, LinkedIn®, YouTube®, Instagram®, or other social media website), video conference, video game messaging, email, or electronic interaction retail vendors (e.g., access to e-commerce websites to make purchases, including Internet sites such as Amazon®, Netflix®, iTunes®, or other e-commerce sites, as well as in-game purchasing).

In some embodiments, if the specified communication technology is telephonic voice communication, then the real-time access control server may run a voice call authorization process. The voice call authorization process may include intercepting, from the first communication device, a voice call initiation request to a second communication device, placing the voice call on hold until an enablement flag is set to true by an administrator, and connecting the call between the first communication device and the second communication device. Accordingly, for example, in this embodiment, if a user attempts to call a contact from his or her cellular phone, the real-time access control server would intercept the call and place the call on hold, initiate an authorization alert to an administrator, and wait for the administrator to approve the voice call before connecting the call to the contact.

Still referring to FIG. 1, verification engine 108 may also verify the identity of a particular target contact using a verification algorithm as a function of both manual verification parameters and/or automated verification parameters. Manual verification parameters may include, for example, verification from other users, manual override from an administrator as defined in system list of trusted administrators, an interview from a third party verification administrator in person or via video conference. Automated verification parameters may include verification of a contacts first name, last name, birth date, physical address, email address, phone number, social security number, and/or other identifying information as compared with the same information stored in public record databases or privately stored contacts lists. Verification engine 108 may then calculate a trust score, T, as a function of the manual verification parameters, xi(m), and the automated verification parameters $x_i(a)$, such that $T=f(x_i(m),x_i(a))$. If T is greater that a pre-defined threshold value, then verification engine 108 will confirm the identity of the target contact. If T is less than or equal to a pre-defined threshold, then verification engine 108 will pass communication controller 110 a non-verified contact message, and communication controller 110 will disable communications between the user and the contact.

Still referring to FIG. 1, if verification engine 108 successfully verifies the target contact's identity, but communication with the target contact has not been pre-approved, then verification engine 108 will place an alert message in queue for the administrator seeking approval of the communication request. Communication manager 110 will then issue the alert to the administrator device 128, prompting the administrator to approve the communication request. Approval of the communication request may be accomplished by logging into the real-time access control server 100 via a graphical user interface (GUI), displaying the administrator's alert queue, and approving the communication request, as well as selecting communication authorization parameters to define the scope of the authorization. Once the communication request is approved, the communication controller 110 will enable communications between user device 126 and contact device 124 consistent with the selected communication authorization parameters. If the administrator does not approve the communication request, the communication manager 110 will disable communication between user device 126 and contact device 124.

In addition to authorizing communication between a user device 126 and a contact device 124, real-time access control server 100 may also use the same security mechanism described above to enable, disable, and/or restrict access to specific Internet data sources (e.g., restriction of access to Facebook®, restriction of access or purchasing ability on e-commerce site, streaming media sites, in-game purchases within video games, etc.). Real-time access control server 100 may also provide logging, archiving, and real-time monitoring of a user's Internet activity (e.g., tracking pages visited, content viewed, purchases made on an e-commerce or media streaming site, etc.).

As illustrated in FIG. 1, administrator device 128, user device 126, and contact device 124 may each communicate through the same, or different Internet gateway devices, or firewalls, to access the Internet and the real-time access control server 100.

Figure 2:
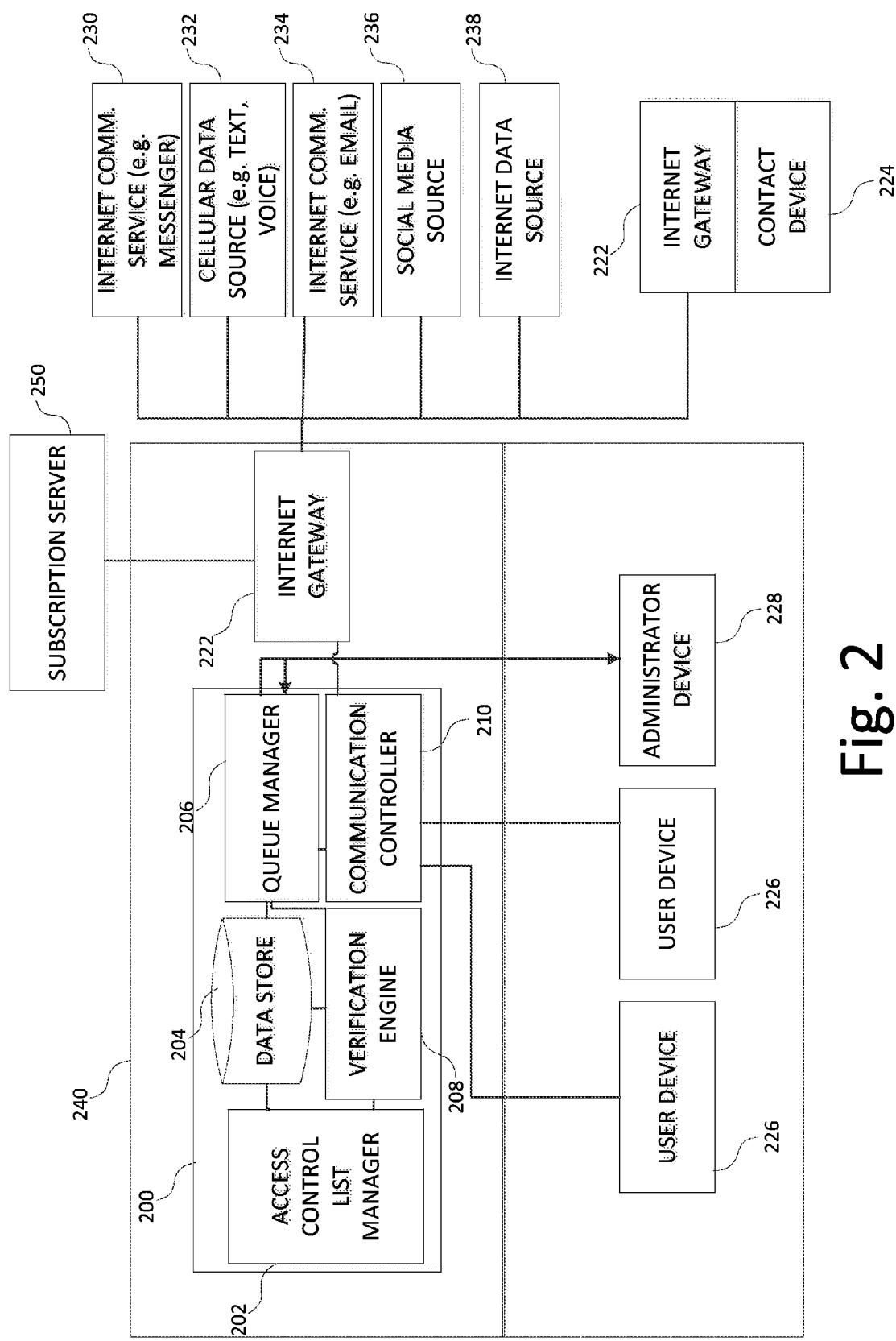
FIG. 2 is a block diagram illustrating a system for real-time communication authorization consistent with embodiments disclosed herein.

Referring now to FIG. 2, a first user device 226 may be a communication initiation device, and a second user device 226 may be a communications target device, or contact device. More than two user devices 226 may be present on a network, and registered with real-time access control appliance 200. Moreover, user devices 226, administrator device 228, and real-time access control appliance 200 may all be located on the same local area network behind Internet gateway 222, such that real-time access control appliance 200 may also function as an Internet proxy server/security appliance device. In some embodiments, user devices 226 and administrator device 228 may be located on any network, but real-time access control appliance 200 is located on a private local area network, as opposed to being centrally hosted on a wide area network (i.e., the Internet or cloud). In this example, the private local area network is managed and hosted at a private residence, or within a commercial building, for the purpose of managing and authorizing electronic communication for an individual family or company. In addition, contact device 224 may be located on a separate local area network behind a separate Internet gateway 222.

Still referring to FIG. 2, a subscription server, 250, may be hosted on the Internet and enable licensing for real-time access control server 200, as well as for user devices 226 and administrator device 228. As illustrated, one of skill in the art would appreciate that the functionality of the real-time access control system illustrated in FIG. 2 is substantially similar to the real-time access control system illustrated in FIG. 1, except that real-time access control appliance 200 is located on a private local area network as real-time access control server opposed to being centrally hosted.

Figure 3:
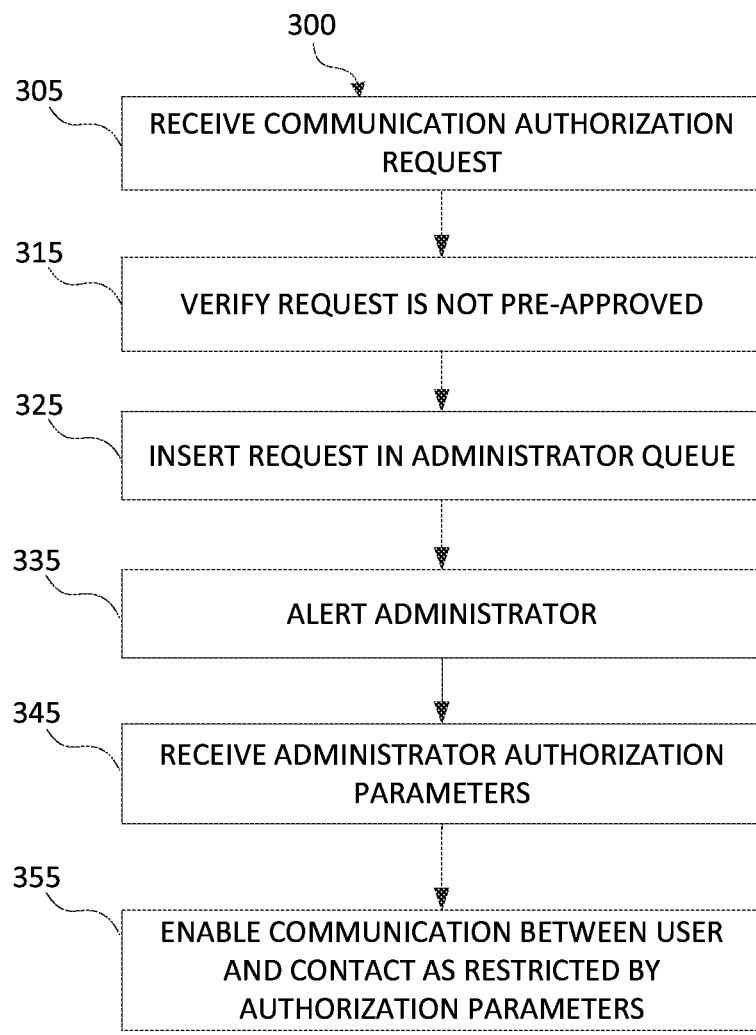
FIG. 3 is a process flow diagram illustrating a real-time communication approval process consistent with embodiments disclosed herein.

Some embodiments of the disclosure provide a method for real-time communication authorization. Referring to FIG. 3, a method for real-time communication authorization 300 includes receiving, from a first user device, a communication request at step 305 and verifying, with a verification engine, a pre-approval status of the communication request at step 315. The communication request may specify a target contact with whom the user desires to communicate and one or more desired communication protocols, such as email software, instant messaging or text messaging software, social media software (e.g., Facebook®, LinkedIn®, Instagram®, YouTube®, or other social media communication applications), video conferencing software (e.g., Facetime®, Skype®, etc.), or voice communication software (e.g., current cellular phone communication software, Skype®, etc.).

Still referring to FIG. 3, and referring back to FIG. 1, the verification engine 108 may verify the identity of a particular target contact using the verification algorithm as a function of both manual verification parameters and/or automated verification parameters. Verification engine 108 may then calculate a trust score, $T=f(x_i(m),x_i(a))$. If T is greater that a pre-defined threshold value, then verification engine 108 will confirm the identity of the target contact. If T is less than or equal to a pre-defined threshold, then verification engine 108 may pass communication controller 110 a non-verified contact message, and communication controller 110 will disable communications between the user and the contact. Alternatively, the verification engine 108 may be used to verify identity of system users, administrators, or third-parties based on requests from the real-time communication authorization server, or from third-party applications through the use of a verification API or proxy.

The method for real-time communication authorization 300 may further include inserting the communication request in an administrator queue, at step 325, if verification engine 108 successfully verifies the target contact's identity, but communication with the target contact has not been pre-approved. For example, the communication request may be stored in an approval queue if the communication request has not been pre-authorized. The method may further include issuing an alert to the administrator for approval at step 335.

Still referring to FIG. 3, the method for real-time communication authorization 300 may further include receiving one or more administrator authorization parameters at step 345. Approval of the communication request may be accomplished by logging into the real-time access control server 100 via a graphical user interface (GUI), displaying the administrator's alert queue, and approving the communication request, as well as selecting communication authorization parameters to define the scope of the authorization. The method may also include enabling communication between the user and the contact as restricted by the one or more authorization parameters at step 355 if the communication request is approved. If the administrator does not approve the communication request, communication between the user and the contact will remain disabled.

Figure 4:
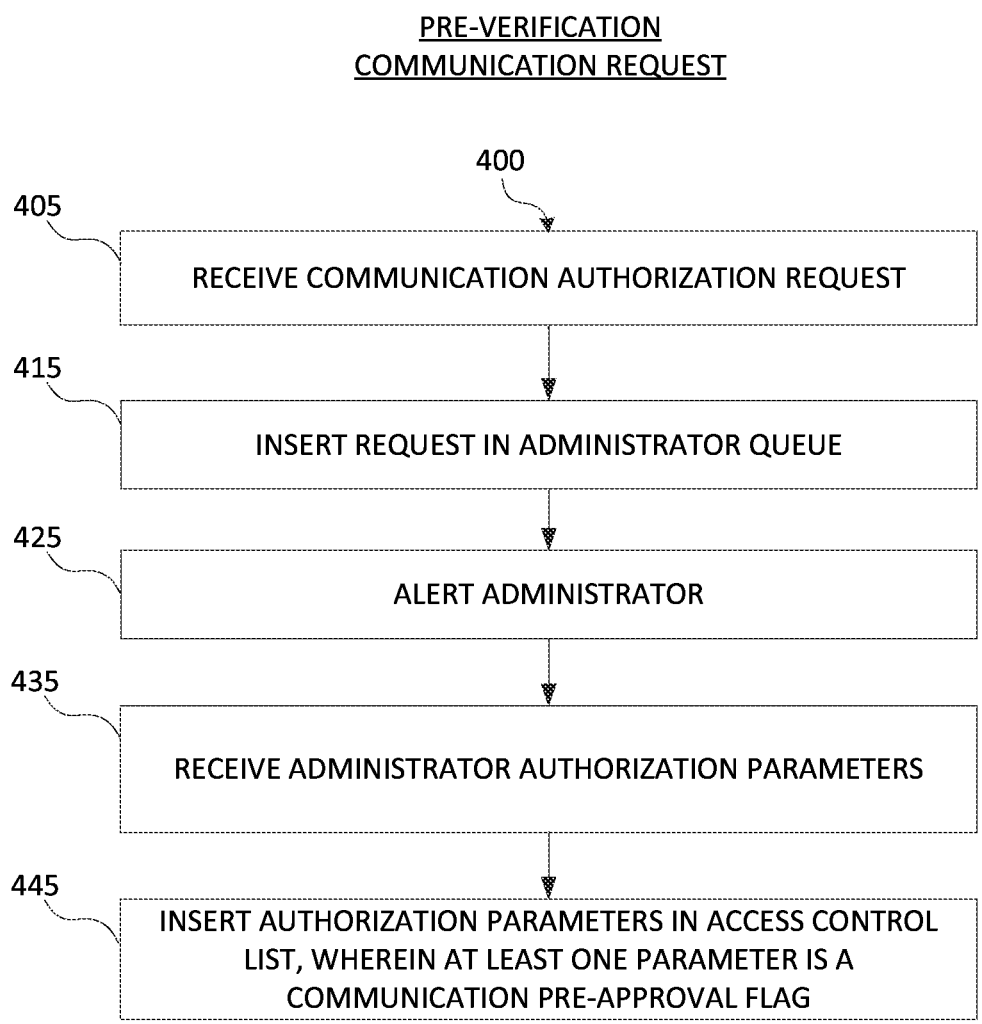
FIG. 4 is a process flow diagram illustrating a pre-verification communication approval process consistent with embodiments disclosed herein.

Referring to FIG. 4, a method for pre-authorization of a communication request 400 includes receiving a communication request at step 405 and inserting the communication request in an administrative queue at step 415. The method may also include issuing an alert to the administrator at step 425 and receiving administrative authorization parameters at step 435, wherein one of the administrative authorization parameters pre-approves communications between a user and a target contact. The method may further include inserting the authorization parameters in an access control list at step 445.

Figure 5:
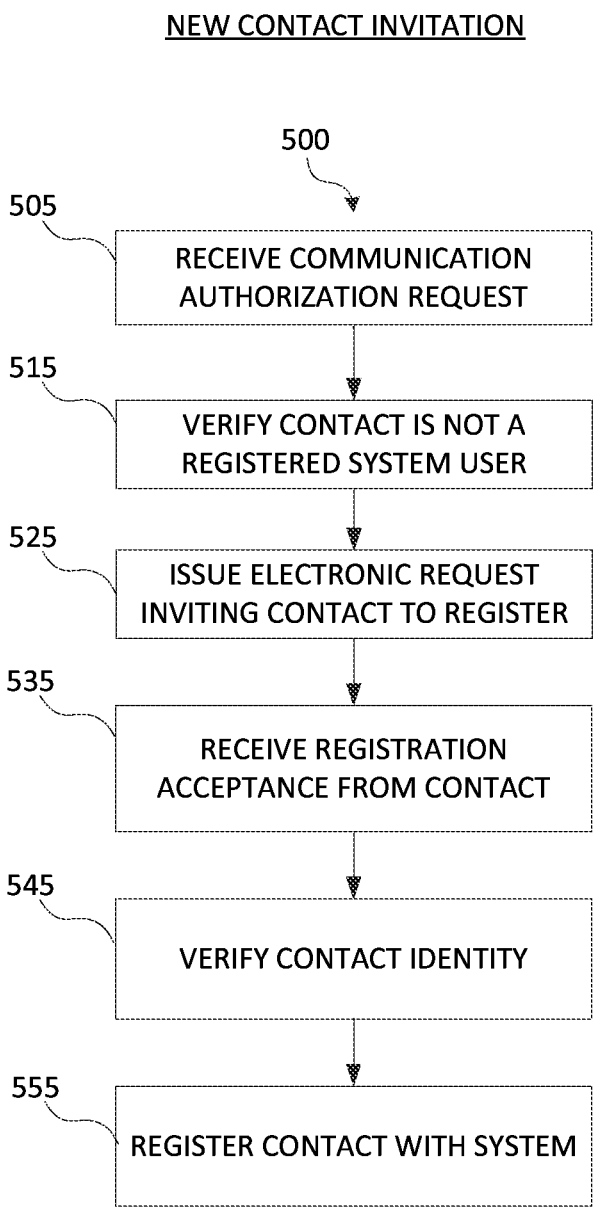
FIG. 5 is a process flow diagram illustrating a new contact invitation process consistent with embodiments disclosed here.

Referring to FIG. 5, a new contact invitation method 500 may include receiving a communication request that specifies an unregistered target contact at step 505. For example, the method may include verifying that the contact is not a registered system user at step 515. The method may further include issuing an electronic request inviting the contact to register at step 525. The issuing of the electronic request may actually be sent to a target contact's parent or legal guardian if the target contact is a minor, or to the target contact's employer if the target contact is an employee. The method may also include receiving a registration acceptance and verifying the contacts identity. For example, referring back to FIG. 1, the method may use a verification engine, such as verification engine 108, to perform an identity verification process. The method may also include registering the contact with the system if, for example, the contact's identity is verified.

Figure 6:
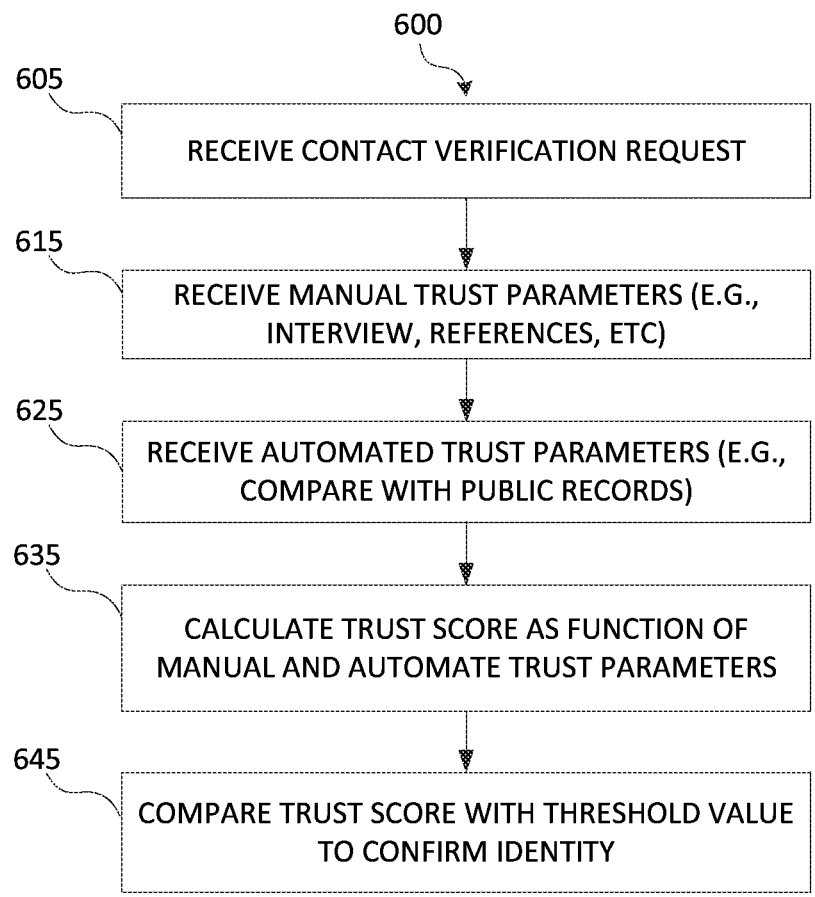
FIG. 6 is a process flow diagram illustrating a contact verification process consistent with embodiments disclosed herein.

Referring to FIG. 6, a verify contact identity process 600 may include receiving a contact verification request at step 605, receiving manual trust parameters at step 615, and/or receiving automated trust parameters at step 625. For example, manual verification parameters may include verification from other users, manual override from an administrator as defined in system list of trusted administrators, and/or an interview from a third party verification administrator in person or via video conference. Automated verification parameters may include verification of a contacts first name, last name, birth date, phone number, email address, physical address, social security number, and/or other identifying information as compared with the same information stored in public record databases or private contact databases. The method may also include calculating a trust score, T, as a function of the manual verification parameters, $x_i(m)$, and the automated verification parameters $x_i(a)$ at step 635. For example, $T=f(x_i(m),x_j(a))$. The method may also include comparing the trust score, T, with a threshold value to confirm identity at step 645. For example, referring back to FIG. 1, if T is greater that a pre-defined threshold value, then verification engine 108 may confirm the identity of the target contact. If T is less than or equal to a pre-defined threshold, then verification engine 108 may pass communication controller 110 a non-verified contact message, and communication controller 110 will disable communications between the user and the contact. Alternatively, the verification engine 108 may be used to verify identity of system users, administrators, or third-parties based on requests from the real-time communication authorization server, or from third-party applications through the use of a verification API or proxy.

Figure 7:
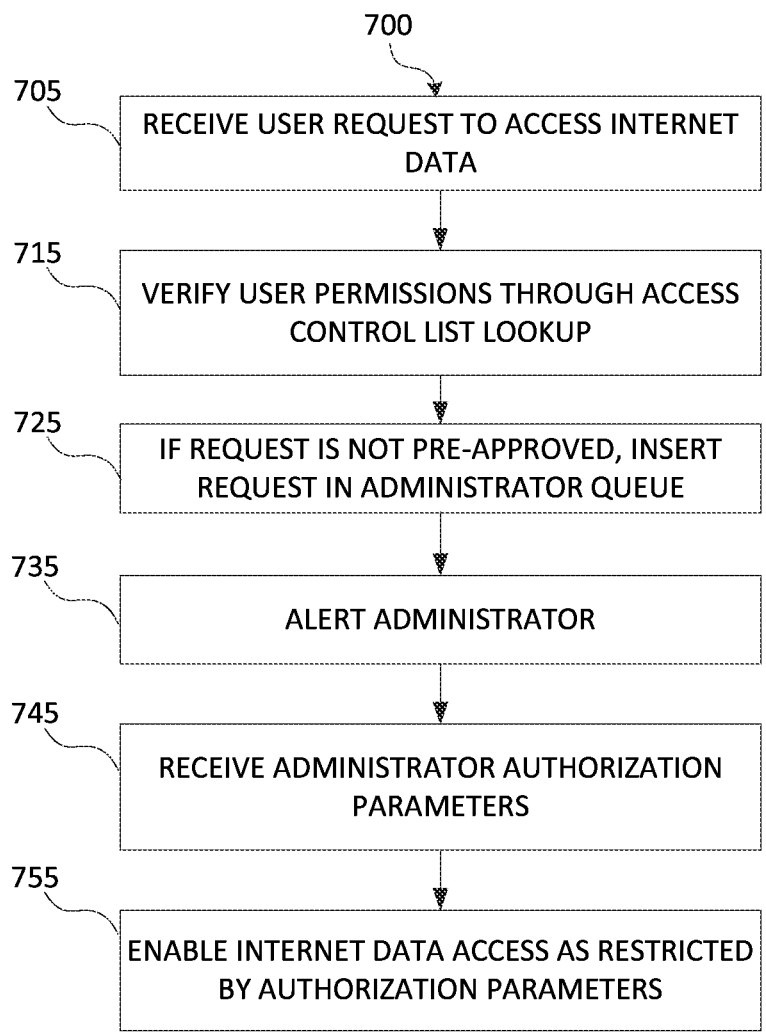
FIG. 7 is a process flow diagram illustrating an Internet data access approval process consistent with embodiments disclosed herein.

Some embodiments of the disclosure provide a method for Internet data access approval. Referring to FIG. 7, a method for Internet data access approval 700 includes receiving a user request to access an Internet data source at step 705. For example, the Internet data source may be any of the Internet data sources illustrated in FIG. 1, 130, 132, 134, 136, or 138. Moreover, one of ordinary skill in the art would appreciate that the Internet data access request could be to other data sources, available for example on a local area network or database, as well as any subset of any of the listed Internet data sources, such as Internet website pages that meet certain content or structure criteria.

Still referring to FIG. 7, the method for Internet data access approval may further include verifying the user permissions based on parameters stored in an access control list at step 715, and, if the request is not pre-approved, inserting the request in an administrator queue at step 725. One of ordinary skill in the art would recognize that the approval process described herein for Internet data access is substantially similar to the processes illustrated by FIGS. 3-6. For example, the method for Internet data access approval may further include alerting an administrator of the access request at step 735 and receiving authorization parameters at step 745. The authorization parameters may include, for example, an indication as to whether the request is approved (e.g., approval=true or false), a parameter indicating how long the approval will be effective, and any other limiting parameters, such as whether the user's web browser content will be logged, archived, and/or copied to an administrator monitoring window display. The method may also enable the Internet data access as restricted by the authorization parameters at step 755.

In some embodiments, a family or company may use a shared account to manage the real-time access control server. For example, each user device and the administrator device may each register with the real-time access control server using the shared account, wherein the shared account includes an administrative login and one or more user logins. Accordingly, the administrator may configure user-specific authorization parameters for each user on the system. The administrator may then monitor and/or control real-time communication approval for each user according to the separately configurable user-specific authorization parameters.

As used herein, the term "system" might describe a given unit of functionality that can be performed in accordance with one or more embodiments of the present invention. As used herein, a system might be implemented utilizing any form of hardware, software, or a combination thereof. For example, one or more processors, controllers, ASICs, PLAs, PALs, CPLDs, FPGAs, logical components, software routines or other mechanisms might be implemented to make up a system. In implementation, the various systems described herein might be implemented as discrete systems or the functions and features described can be shared in part or in total among one or more systems. In other words, as would be apparent to one of ordinary skill in the art after reading this description, the various features and functionality described herein may be implemented in any given application and can be implemented in one or more separate or shared systems in various combinations and permutations. Even though various features or elements of functionality may be individually described or claimed as separate systems, one of ordinary skill in the art will understand that these features and functionality can be shared among one or more common software and hardware elements, and such description shall not require or imply that separate hardware or software components are used to implement such features or functionality.

Figure 8:
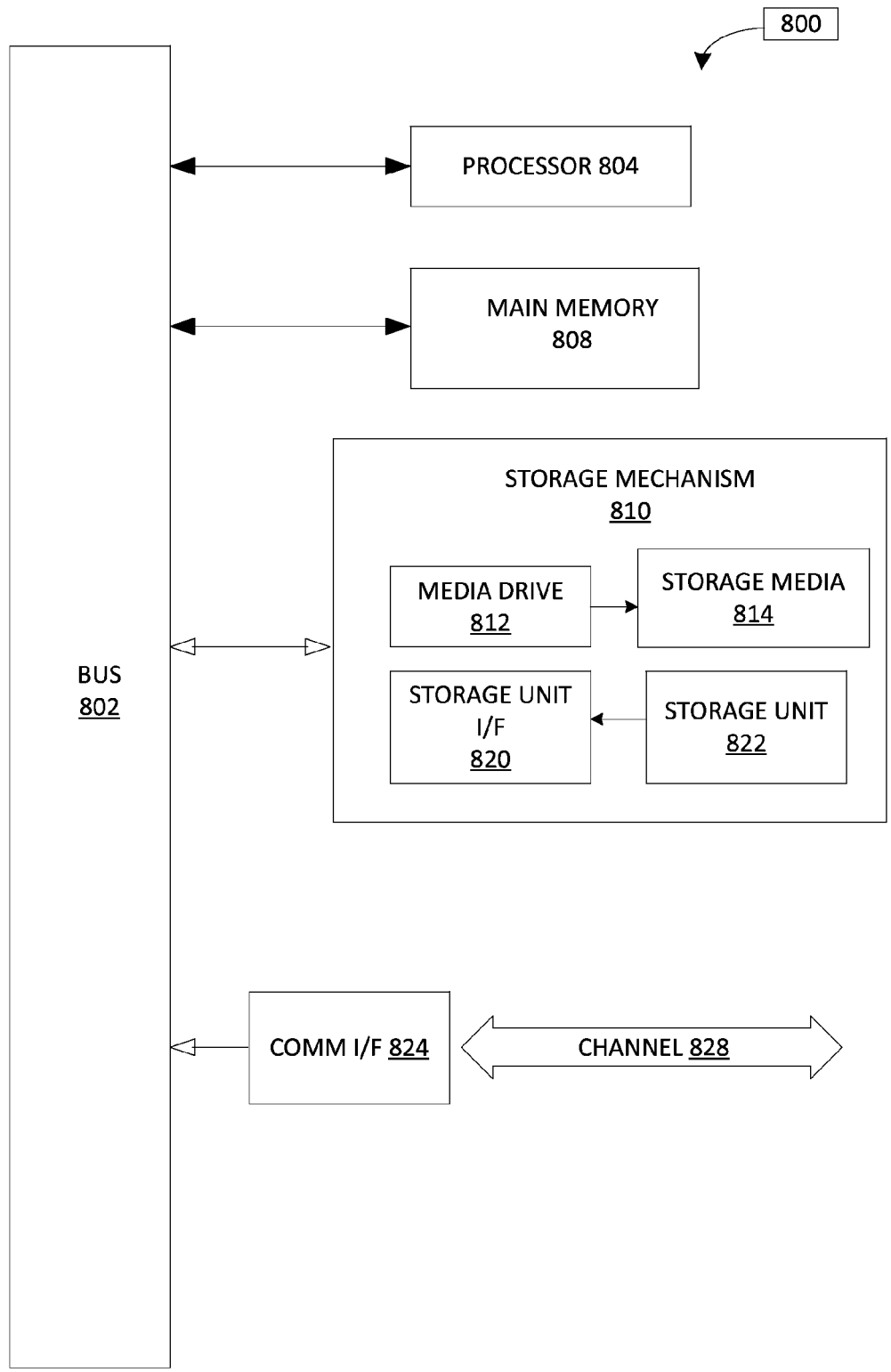
FIG. 8. is a is a diagram illustrating an exemplary computing module that may be used to implement any of the embodiments disclosed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent system names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Where components or systems of the invention are implemented in whole or in part using software, in one embodiment, these software elements can be implemented to operate with a computing or processing system capable of carrying out the functionality described with respect thereto. One such example-computing system is shown in FIG. 8. Various embodiments are described in terms of this example-computing system 800. After reading this description, it will become apparent to a person skilled in the relevant art how to implement the invention using other computing systems or architectures.

Referring now to FIG. 8, computing system 800 may represent, for example, computing or processing capabilities found within desktop, laptop and notebook computers; hand-held computing devices (PDA's, tablets, smart phones, cell phones, palmtops, etc.); mainframes, supercomputers, workstations or servers; or any other type of special-purpose or general-purpose computing devices as may be desirable or appropriate for a given application or environment. Computing system 800 might also represent computing capabilities embedded within or otherwise available to a given device. For example, a computing system might be found in other electronic devices such as, for example, digital cameras, navigation systems, cellular telephones, portable computing devices, modems, routers, WAPs, terminals and other electronic devices that might include some form of processing capability.

Computing system 800 might include, for example, one or more processors, controllers, control systems, or other processing devices, such as a processor 804. Processor 804 might be implemented using a general-purpose or special-purpose processing engine such as, for example, a microprocessor, controller, or other control logic. In the example illustrated in FIG. 8, processor 804 is connected to a bus 802, although any communication medium can be used to facilitate interaction with other components of computing system 800 or to communicate externally.

Computing system 800 might also include one or more memory systems, simply referred to herein as main memory 808. For example, preferably random access memory (RAM) or other dynamic memory might be used for storing information and instructions to be executed by processor 804. Main memory 808 might also be used for storing temporary variables or other intermediate information during execution of instructions to be executed by processor 804. Computing system 800 might likewise include a read only memory ("ROM") or other static storage device coupled to bus 802 for storing static information and instructions for processor 804.

The computing system 800 might also include one or more various forms of information storage mechanism 810, which might include, for example, a media drive 812 and a storage unit interface 820. The media drive 812 might include a drive or other mechanism to support fixed or removable storage media 814. For example, a hard disk drive, a floppy disk drive, a magnetic tape drive, an optical disk drive, a CD or DVD drive (R or RW), or other removable or fixed media drive might be provided. Accordingly, storage media 814 might include, for example, a hard disk, a floppy disk, magnetic tape, cartridge, optical disk, a CD or DVD, or other fixed or removable medium that is read by, written to or accessed by media drive 812. As these examples illustrate, the storage media 814 can include a computer usable storage medium having stored therein computer software or data.

In alternative embodiments, information storage mechanism 810 might include other similar instrumentalities for allowing computer programs or other instructions or data to be loaded into computing system 800. Such instrumentalities might include, for example, a fixed or removable storage unit 822 and an interface 820. Examples of such storage units 822 and interfaces 820 can include a program cartridge and cartridge interface, a removable memory (for example, a flash memory or other removable memory system) and memory slot, a PCMCIA slot and card, and other fixed or removable storage units 822 and interfaces 820 that allow software and data to be transferred from the storage unit 822 to computing system 800.

Computing system 800 might also include a communications interface 824. Communications interface 824 might be used to allow software and data to be transferred between computing system 800 and external devices. Examples of communications interface 824 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 824 might typically be carried on signals, which can be electronic, electromagnetic (which includes optical) or other signals capable of being exchanged by a given communications interface 824. These signals might be provided to communications interface 824 via a channel 828. This channel 828 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 808, storage unit 820, media 814, and signals on channel 828. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing system 800 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent system names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "system" does not imply that the components or functionality described or claimed as part of the system are all configured in a common package. Indeed, any or all of the various components of a system, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-based method for real-time communication authorization comprising:
   receiving, from a first communication device, a communication request, wherein the communication request comprises a specified communication technology selected from a set of supported communication technologies;
   verifying, with a real-time communications approval server, a pre-approval status of the communication request;
   storing, with the real-time communications approval server, the communication request in an approval queue if the pre-approval status is set to false;
   receiving, from an authorization device, one or more authorization parameters, wherein the one or more authorization parameters comprises an enablement flag;
   receiving a contact verification request;
   receiving one or more trust parameters;

calculating a trust score as a function of the one or more trust parameters; and uniquely identifying the target contact if the trust score is greater than a threshold value.

2. The computer-based method of claim 1, enabling communication between the first communication device and a second communication device using the specified communication technology if the enablement flag is set to true.

3. The computer-based method of claim 1, wherein set of supported communication technologies comprises telephonic voice communication, short message service texting, instant messaging, social media messaging, social media posting, video conference, video game messaging, email, or electronic interaction retail vendors.

4. The computer-based method of claim 1, further comprising implementing a voice call authorization process if the specified communication technology is telephonic voice communication, the voice call authorization process comprising:

intercepting, from the first communication device, a voice call initiation request to a second communication device;

placing the voice call on hold until the enablement flag is set to true;

enabling communication between the first communication device and the second communication device using telephonic voice communication.

5. The computer-based method of claim 4, wherein the first communication device and the authorization device each register with the real-time access control server using a shared account, wherein the shared account comprises an administrative login and one or more user logins, and wherein real-time communication authorization for each of the one or more user logins is managed using a set of user-specific authorization parameters.

6. The computer-based method of claim 5, further comprising:

configuring, from the administrative login, each of the sets of user-specific authorization parameters.

7. The computer-based method of claim 1, wherein the one or more trust parameters comprise automated trust parameters or manual trust parameters.

8. The computer-based method of claim 7, wherein the automated parameters comprise a first name, a last name, a date of birth, an email address, a physical address, a phone number, or a social security number.

9. The computer-based method of claim 1, further comprising issuing a new contact invitation if the communication request specifies an unregistered target contact, wherein the issuing a new contact invitation comprises:

issuing an electronic invitation to a specified communication contact address for a parent or legal guardian of the unregistered target contact, the electronic invitation comprising an Internet webpage address, wherein the Internet webpage address points to a registration acceptance form;

receiving a registration acceptance confirmation from the target contact if the parent or legal guardian of the target contact completes the registration acceptance form; and registering the target contact.

\* \* \* \* \*